United States Patent
Uhm et al.

(10) Patent No.: US 12,153,822 B2
(45) Date of Patent: Nov. 26, 2024

(54) STORAGE DEVICE, HOST SYSTEM HAVING THE SAME, AND OPERATING METHOD THEREOF

(71) Applicant: SAMSUNG ELECTRONICS CO., LTD., Suwon-si (KR)

(72) Inventors: Junyong Uhm, Seoul (KR); Junggyu Kim, Hwaseong-si (KR); Eunjoo Oh, Suwon-si (KR); Jaesub Kim, Seoul (KR); Yangwoo Roh, Hwaseong-si (KR); Jeongbeom Seo, Seoul (KR); Jaewon Song, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 75 days.

(21) Appl. No.: 17/865,035

(22) Filed: Jul. 14, 2022

(65) Prior Publication Data
US 2023/0195308 A1 Jun. 22, 2023

(30) Foreign Application Priority Data
Dec. 21, 2021 (KR) .......................... 10-2021-0183355

(51) Int. Cl.
*G06F 3/06* (2006.01)
*G06F 12/084* (2016.01)

(52) U.S. Cl.
CPC .......... *G06F 3/0653* (2013.01); *G06F 3/0604* (2013.01); *G06F 3/0673* (2013.01); *G06F 12/084* (2013.01)

(58) Field of Classification Search
CPC .................................................... G06F 3/0653
See application file for complete search history.

(56) References Cited

U.S. PATENT DOCUMENTS

| | | |
|---|---|---|
| 10,089,212 B2 | 10/2018 | Iwai |
| 10,140,170 B2 | 11/2018 | Damron et al. |
| 10,423,342 B1* | 9/2019 | Chheda ................. G06F 3/0685 |
| 10,579,458 B2 | 3/2020 | Ko et al. |
| 10,580,512 B2 | 3/2020 | Subramanian et al. |
| 10,585,822 B2 | 3/2020 | Lee et al. |
| 10,942,800 B2 | 3/2021 | Yun et al. |
| 2018/0253369 A1* | 9/2018 | O'Dowd ............. G06F 11/3636 |
| 2020/0004431 A1* | 1/2020 | Chiang ................. G06F 3/0653 |
| 2020/0409566 A1* | 12/2020 | Demoor ................. G06F 16/27 |
| 2021/0056000 A1* | 2/2021 | Rostagni ............. G06F 11/0793 |

FOREIGN PATENT DOCUMENTS

| | | | |
|---|---|---|---|
| JP | 3992029 B2 | 10/2007 | |
| KR | 10-2007-0003454 A | 1/2007 | |

* cited by examiner

*Primary Examiner* — Joseph D Torres
(74) *Attorney, Agent, or Firm* — Sughrue Mion, PLLC (57) ABSTRACT

A host system includes a host device configured to generate a first log, a storage device configured to generate at least one second log, and a shared memory configured to store the first log and to store composite logs corresponding to the first log and the at least one second log. The storage device reads the first log from the shared memory, adds a timestamp and log-type information to the first log and the at least one second log to generate the composite logs, and writes the composite logs to the shared memory.

13 Claims, 12 Drawing Sheets

STORAGE DEVICE, HOST SYSTEM HAVING THE SAME, AND OPERATING METHOD THEREOF

CROSS-REFERENCE TO RELATED APPLICATION(S)

This application is based on and claims benefit of priority to Korean Patent Application No. 10-2021-0183355 filed on Dec. 21, 2021 in the Korean Intellectual Property Office, the disclosure of which is incorporated herein by reference in its entirety.

BACKGROUND

1. Field

The disclosure relates to a storage device, a host system including the storage device, and a method of operating the storage device.

2. Description of Related Art

In general, a host system includes a host device and a storage device. The storage device includes a memory controller and a memory device. In the host system, the host device and the storage device are connected to each other through various interface standards such as universal flash storage (UFS), serial ATA (SATA), small computer system interface (SCSI), serial attached SCSI (SAS), embedded multimedia card (eMMC), and the like. The host device includes a host memory provided therein, independently of the storage device. Recently, research is being conducted into a technology for using a host memory as a cache memory of a storage device.

SUMMARY

Example embodiments provide a storage device efficiently performing debugging, a host system including the storage device, and a method of operating the storage device.

According to an aspect of the disclosure, there is provided a host system including: a host device configured to generate a first log, a storage device configured to generate at least one second log and a shared memory configured to store the first log and composite logs corresponding to the first log and the at least one second log, wherein the storage device is further configured to: read the first log from the shared memory, generate the composite logs by adding a timestamp and log-type information to the first log and the at least one second log, and write the composite logs to the shared memory.

According to an aspect of the disclosure, there is provided an operating method of a storage device, the method including: detecting generation of a host log of a host device, reading the host log from a shared memory based on a detection of the generation of the host log, collecting device logs generated in the storage device, generating a composite log corresponding to each of the host log and the device logs, using a timestamp and writing the composite log to the shared memory.

According to an aspect of the disclosure, there is provided a storage device including: at least one nonvolatile memory device and a controller comprising at least one processor and configured to control the at least one nonvolatile memory device, wherein the at least one processor is configured to execute a live debugger to: collect a first log of an external host device and second logs of internal devices, add a timestamp and a log type to the collected logs, arrange the logs, to which the timestamp and the log type are added, in a time sequence to generate composite logs, and store the generated composite logs in a shared memory.

According to an aspect of the disclosure, there is provided an apparatus including: a memory storing one or more instructions; and a processor configured to execute the one or more instructions to: detect that a first log of an external device is stored in a shared memory, generate a composite log based on the first log and one or more second logs of the apparatus, and store the composite log in the shared memory.

BRIEF DESCRIPTION OF DRAWINGS

The above and other aspects, features, and advantages of the disclosure will be more clearly understood from the following detailed description, taken in conjunction with the accompanying drawings.

DETAILED DESCRIPTION

Hereinafter, example embodiments will be described with reference to the accompanying drawings.

In general, it is often difficult to analyze a storage device for a data center when an issue depending on an end user's use of a product occurs after the product is shipped. A plurality of devices are installed based on the characteristics of the data center. Such an issue may occur due to an operation of a host device such as application of a server or setting of a kernel and a BIOS, or may occur due to an incorrect operation of a storage device. Therefore, an interaction between the host device and the storage device should be comprehensively checked to accurately analyze the issues. However, existing logging information is stored in each of the host device and the storage device. Since respective logs have different formats and are based on different times, each operation has to be confirmed separately. Moreover, an additional operation is required to adjust log information to check the interaction between the host device and the storage device.

According to example embodiments, in a host system and a logic information management method performed in the host system, debugging information about a host device and debugging information about a storage device may be synchronized using a shared memory to perform logging. The host device and the storage device may share a shared memory storing debugging information. The storage device may include a live debugger managing the shared memory. The live debugging unit may control the shared memory to manage a debugging log of the host system and a debugging log of the storage device. According to example embodiments, an operation between the host device and the storage device, such as quality of service (QOS) failure, may be comprehensively analyzed using the debugging information stored in the shared memory.

Figure 1:
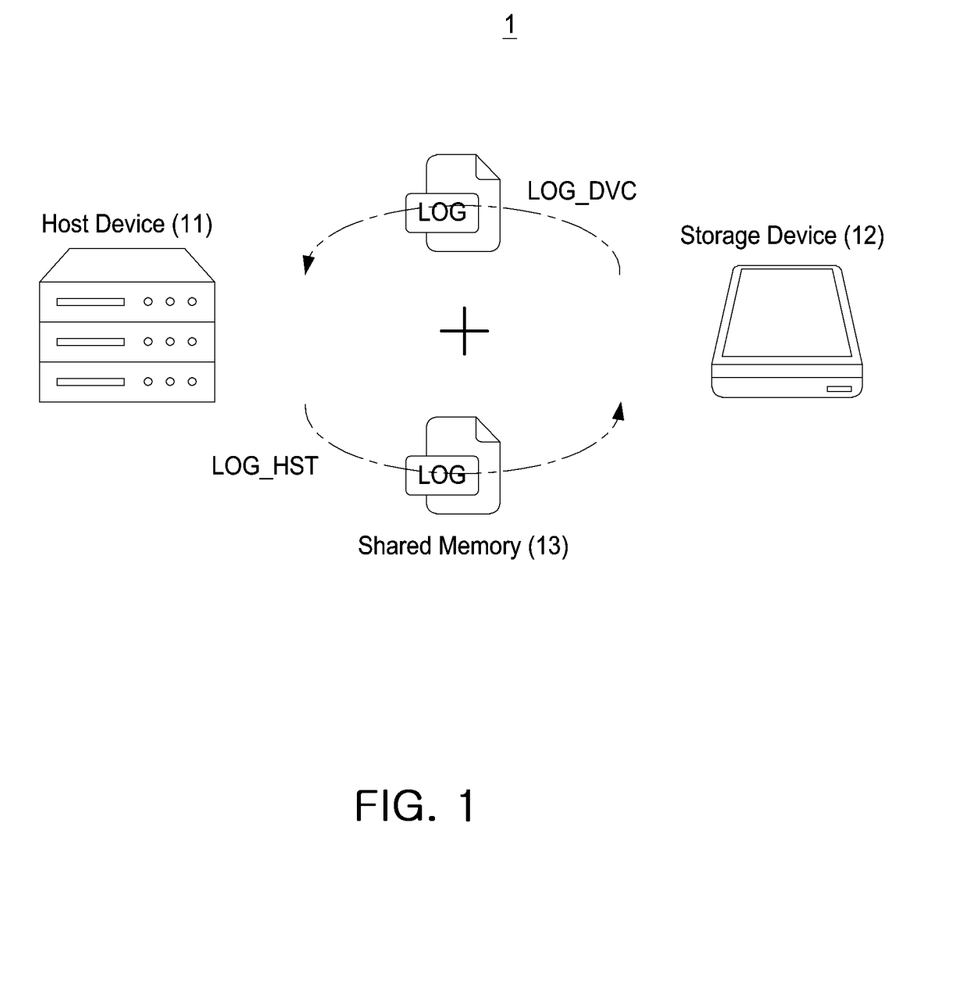
FIG. 1 is a conceptual diagram of a host system, illustrating management of debugging information, in the disclosure.

FIG. 1 is a conceptual diagram of a host system 1, illustrating management of debugging information, in the disclosure. Referring to FIG. 1, the host system 1 may include a host device 11, a storage device 12, and a shared memory 13.

The shared memory 13 may be configured to store debugging information about each of the host device 11 and the storage device 12. For example, the shared memory 13 may store the first log information LOG_HST of the host device 11, or may store the second log information LOG_DVC of the storage device 12. The first log information LOG_HST may include a system log, a kernel log, and the like, generated to drive the host device 11. The second log information LOG_DVC may include a device log, a host interface log (for example, a PCIe log or an NVMe log), and the like, generated to drive the storage device 12. In an example embodiment, the first log information LOG_HST and the second log information LOG_DVC may be stored in the shared memory 13 in the same log format.

In the debugging information management method of the host system 1 according to an example embodiment, the debugging information may be stored in the shared memory 13 to significantly reduce the overhead of an interface and to address a log synchronization issue.

Figure 2:
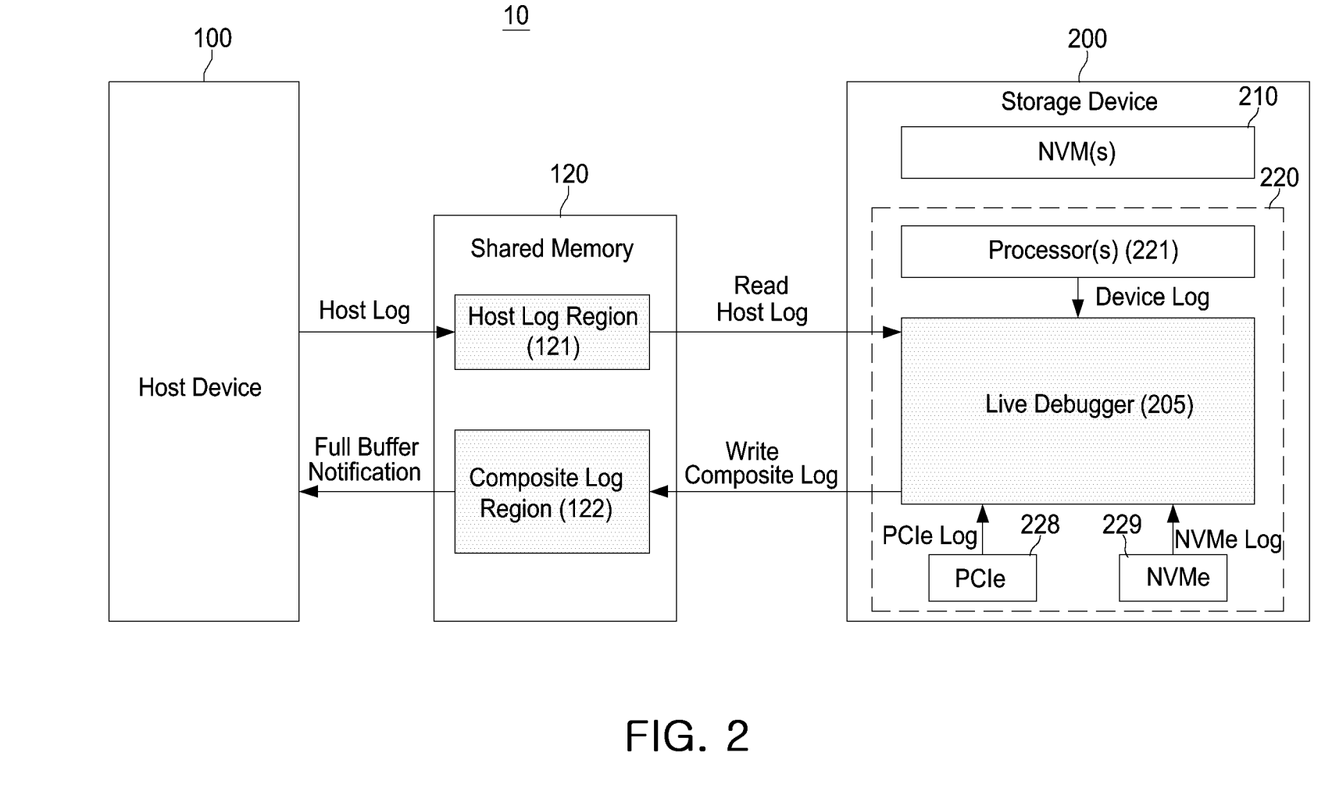
FIG. 2 is a diagram illustrating a host system according to an example embodiment.

FIG. 2 is a diagram illustrating a host system 10 according to an example embodiment. Referring to FIG. 2, the host system 10 may include a host device 100 and a storage device 200.

The host device 100 may include at least one processor. At least one processor may be configured to control the overall operation of the host device 100. For example, the processor may be a central processing unit (CPU), an application processor, a modem-integrated application processor, a system-on-chip (SoC), an integrated circuit, or the like. The processor may be configured to execute an operating system. The operating system may include a file system for file management. For example, file systems may include at least one of various file systems such as a file allocation table (FAT), a FAT32, an NT file system (NTFS), a hierarchical file system (HFS), a journaled file system2 (JSF2), an XFS, an on-disk structure-5 (ODS-5), a UDF, a ZFS, a Unix file system (UFS), an ext2, an ext3, an ext4, a ReiserFS, a Reiser4, ISO 9550, a Gnome VFS, a BFS, and a WinFS.

The shared memory 120 may be configured to store a host log of the host device 100 or to store a composite log of the storage device 200. According to an example embodiment, the host log may be first log information Log_HST of the host device 100 and the composite log may be second log information Log_DVC of the storage device 200. The composite log may include a device log, a host interface log, and the like. In addition, the shared memory 120 may include a host log region 121, in which the host log is stored, and a composite log region 122 in which the composite log is stored.

The host log region 121 may be a region in which log information about the host device 100, such as a kernel log, a system log, or the like, is registered. The host device 100 may update a tail pointer while writing a log to the host log region 121. Accordingly, the live debugger 205 of the storage device 200 may distinguish a previously registered log and a newly registered log from each other. When the host device 100 registers the host log in the host log region 121, the live debugger 205 may recognize a host log registration in real time. For example, the live debugger 205 may recognize the host log registration using a method such as a special function register (SFR) polling scheme, an NVMe doorbell interface scheme, an interrupt scheme, or the like. In addition, the host device 100 and the storage device 200 may directly access/share the host log region 121 of the shared memory 120 to significantly reduce overhead required to transmit a host log to the storage device 200.

The composite log region 122 may be a region in which a host log, a PCIe log, an NVMe log, a device log, and the like, are comprehensively written. A composite log may be written to the composite log region 122 by the live debugger 205. The host device 100 and the storage device 200 may read the composite log region 122 to perform debugging.

When the composite log region 122 is full, the shared memory 120 may be configured to notify the host device 100 that the composite log region 122 is full.

In an example embodiment, the shared memory 120 may be implemented as a volatile memory such as a static random access memory (SRAM), a dynamic RAM (DRAM), a synchronous RAM (SDRAM), or the like, or as a nonvolatile memory such as a phase-change RAM (PRAM), a magneto-resistive RAM (MRAM), a resistive RAM (ReRAM), a ferroelectric RAM (FRAM), or the like.

The shared memory 120 illustrated in FIG. 2 may be provided outside the host device 100. However, example embodiments are not be limited thereto. The shared memory 120 may be an internal configuration of the host device 100 or an internal configuration of the storage device 200.

The storage device 200 may include at least one nonvolatile memory device (NVM(s)) 210 and a controller 220.

The nonvolatile memory device (NVM(s)) 210 may include a NAND flash memory, a vertical NAND flash memory (VNAND), a NOR flash memory, and a resistive random access memory (RRAM), a phase-change memory (PRAM), a magnetoresistive random access memory (MRAM), a ferroelectric random access memory (FRAM), a spin transfer torque random access memory (STT-RAM), or the like. The nonvolatile memory device 210 may include a plurality of memory blocks having a plurality of memory cells connected to wordlines and bitlines. Each of the plurality of memory cells may store at least one bit.

The controller 220 may be configured to control the nonvolatile memory device 210. For example, the controller 220 may receive an input/output request from the host device 100 to perform a corresponding input/output operation on the nonvolatile memory device 210. According to an example embodiment, the input/output request may be a read request or a write request from the host device 100 to perform a corresponding input or output operation such as a read operation or a program operation on the nonvolatile memory device 210.

The controller 220 may include at least one processor 221 and a live debugger 205. The at least one processor 221 may be configured to control the overall operation of the storage device 200.

The live debugger 205 may be configured to collect logs generated by the host system 10. For example, the live debugger 205 may read a host log from the shared memory 120 when the host log is generated. Also, the live debugger 205 may collect logs generated in the storage device 210. The logs may be, for example, a device log, a PCIe log, an NVMe log, and the like. As illustrated in FIG. 2, the device log may be generated by the processor 221, the PCIe log may be generated by the PCIe interface circuit 228, and the NVMe log may be generated by the NVMe interface circuit 229.

Also, the live debugger 205 may add a timestamp, a log type, and the like, to the collected logs and arrange the added logs in a time sequence to generate composite logs, and may store the composite logs in the composite log region 122 of the shared memory 120. The timestamp may be a timestamp of the host device 100 or a timestamp of the storage device 200. In an example embodiment, the timestamp of the host device 100 may be transmitted from the host device 100 through a set feature command.

According to an example embodiment, the live debugger 205 may collect logs of the host device 100 and the storage device 200, add information available in a debugging operation to the collected logs, arrange the added logs in a time sequence, and configure the arranged logs into a comprehensive log and manage the comprehensive log.

In an example embodiment, the live debugger 205 may be implemented in hardware, software, or firmware.

A typical host system leaves corresponding log information in each of a host device and a storage device. For this reason, a larger amount of time and effort have been required to adjust each debugging information so as to detect an interaction between the host device and the storage device. In addition, when a log is incorrectly extracted, operations of reproducing an issue and extracting the log should be repeatedly performed. In addition, a physical debugging tool monitoring an interface should be directly connected to detect the interaction between the host device and the storage device. The interface may be, for example, PCIe. Such a physical debugging tool may extract a log and compare the extracted log with a log extracted from each of the host device and the storage device to perform a debugging operation. Such a manner has difficulty in detecting an accurate issue depending on the interaction between the host device and the storage device.

The host system 10 according to an example embodiment may comprehensively log operations of various devices 100 and 200 inside the host system 10 and arrange collected logs based on a timeline and store the arranged logs in the shared memory 120 to analyze composite logs, stored in the shared memory 120, to simply perform a comprehensive debugging operation. For example, the host system 10 according to an example embodiment may comprehensively analyze an issue using log information stored in the shared memory 120.

Figure 3:
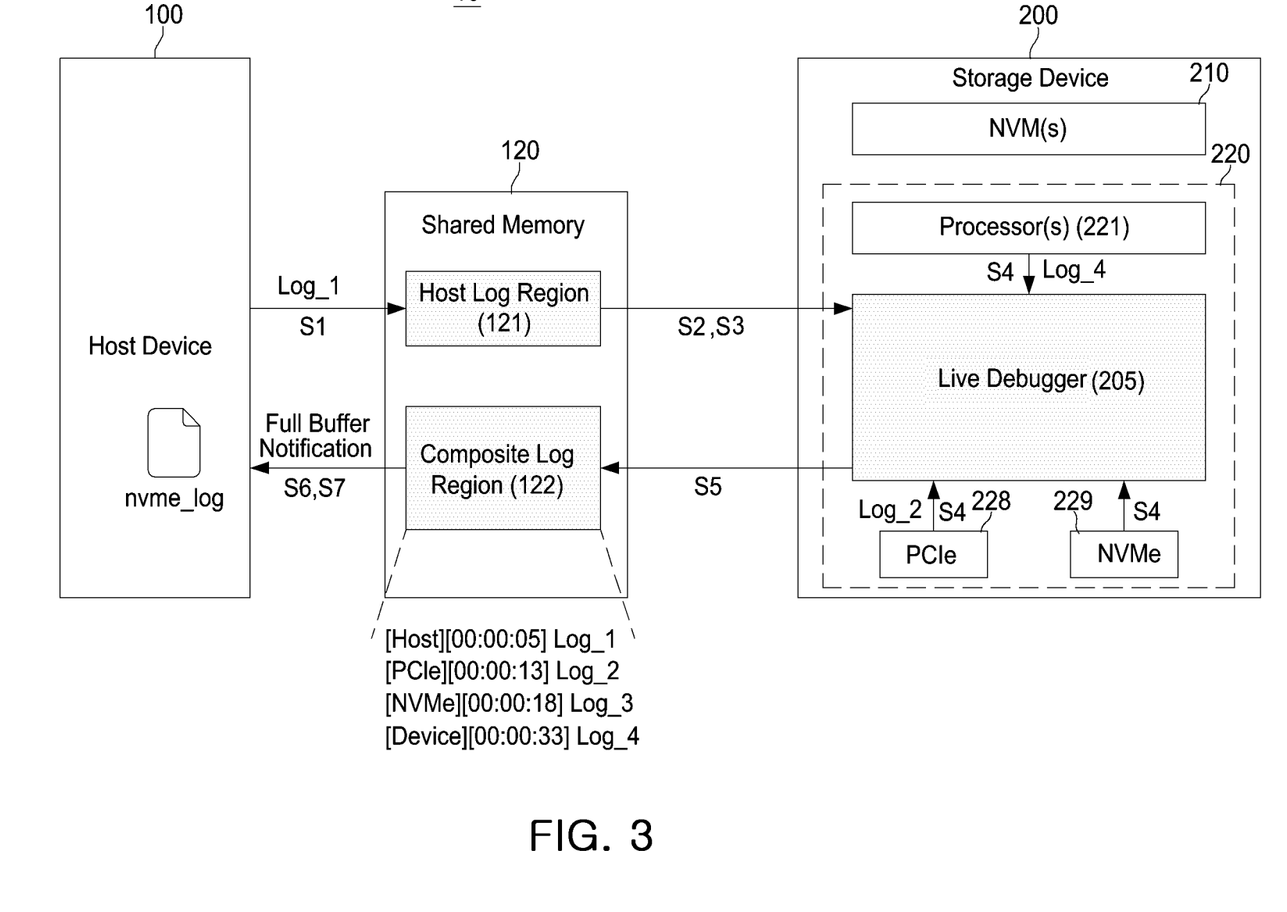
FIG. 3 is a diagram illustrating a management mechanism of an integrated log in a host system according to an example embodiment.

FIG. 3 is a diagram illustrating a management mechanism of an integrated log in a host system according to an example embodiment. Referring to FIG. 3, the management mechanism of the integrated log may be performed, as follows.

The host device 100 may write a log Log_1 of the host device 100 to the host log region 121 of the shared memory 120 (S1). When a new host log Log_1 is written to the shared memory 120, the live debugger 205 may immediately recognize the new host log Log_1 (S2). The recognition may be performed using, for example, a register polling scheme or an interrupt scheme. Then, the live debugger 205 may read the host log Log_1 from the shared memory 205 (S3).

Respective components of the storage device 200 may transmit corresponding logs Log_2, Log_3, and Log_4 to the live debugger 205 (S4). According to an example embodiment, the components of the storage device 200 may be a processor 221, the PCIe interface module, the NVMe interface module, and the like. The live debugger 205 may synchronize the collected logs Log_1, Log_2, Log_3, Log_4 in an integrated format, and may write the synchronized logs to the composite log region 122 of the shared memory 120 (S5). When the collected logs Log_1, Log_2, Log_3, Log_4 are synchronized in the integrated format, a timestamp may be used. A value of such a timestamp may be configured based on a timestamp of the storage device 200 or a timestamp of the host device 100 received through a set feature. In an example embodiment, the composite log may include a combination of a log type, a timestamp, and a log. For example, a composite log of a first log may include [Host] [00:00:05] Log_1, a composite log of a second log may include [PCIe] [00:00:13] Log_2, and a composite log of a third log may include [NVMe] [00:00:18] Log_3, and a composite log of a fourth log may include [Device] [00:00:33] Log_4.

When the buffer of the composite log region 122 is full, the shared memory 120 may notify the host device 100 that the buffer of the composite log region 122 is full (S6). The host device 100 may process a log, generated while storing the log, in a double buffering scheme. The notification may be performed using an asynchronous event request (AER) method, a sideband interface scheme, and the like. The host device 100 may store the composite log as a file nvme_log (S7).

Figure 4:
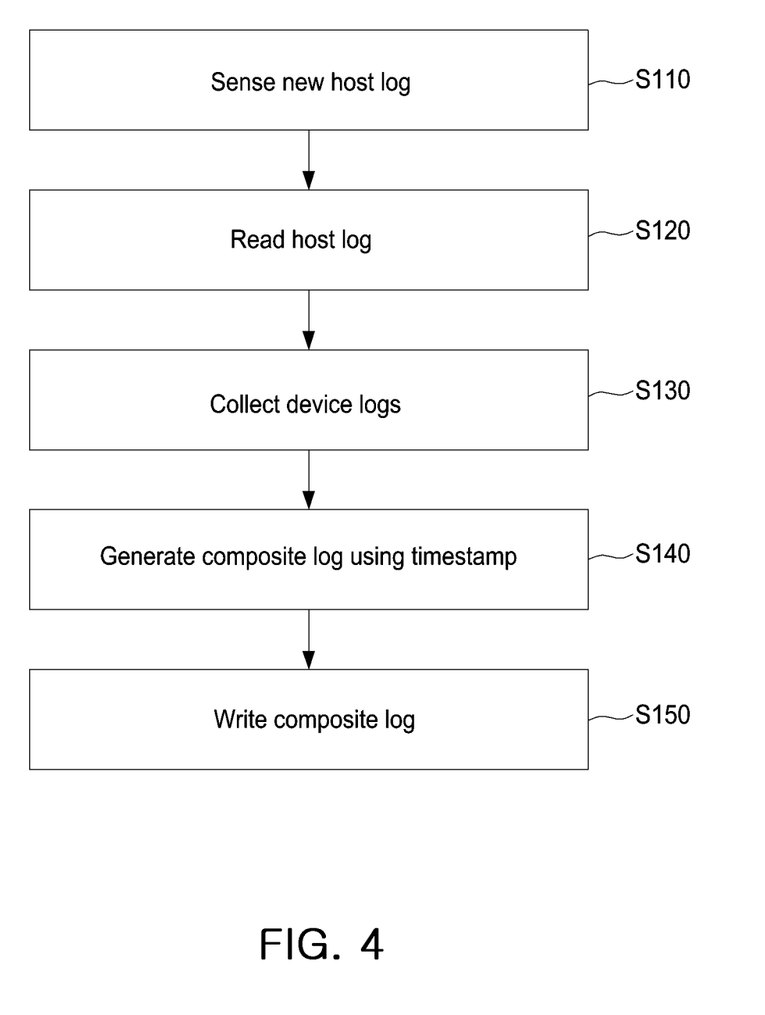
FIG. 4 is a flowchart illustrating an operation of a live debugger of a storage device according to an example embodiment.

FIG. 4 is a flowchart illustrating an operation of a live debugger 205 of a storage device 200 according to an example embodiment. Referring to FIGS. 1 to 4, the live debugger 205 may operate, as follows.

The live debugger 205 may detect a host log in real time (S110). When the host log is detected, the live debugger 205 may read the host log from the shared memory 120 (S120). The live debugger 205 may collect logs from each of the modules 221, 228, and 229 in the storage device 200 (S130). The live debugger 205 may generate a composite log, corresponding to the collected log, using a timestamp (S140). The live debugger 205 may write the composite log to the shared memory 120 (S150). According to an example embodiment, the live debugger 205 may be implemented by hardware, software or a combination of hardware and software. According to an example embodiment, the live debugger 205 may be a computer instruction set or a program, which is executable to by a processor to perform the live debugging operation. However, the disclosure is not limited thereto, and as such, the live debugger 205 may be implemented in other ways to perform the live debugging operation.

Figure 5:
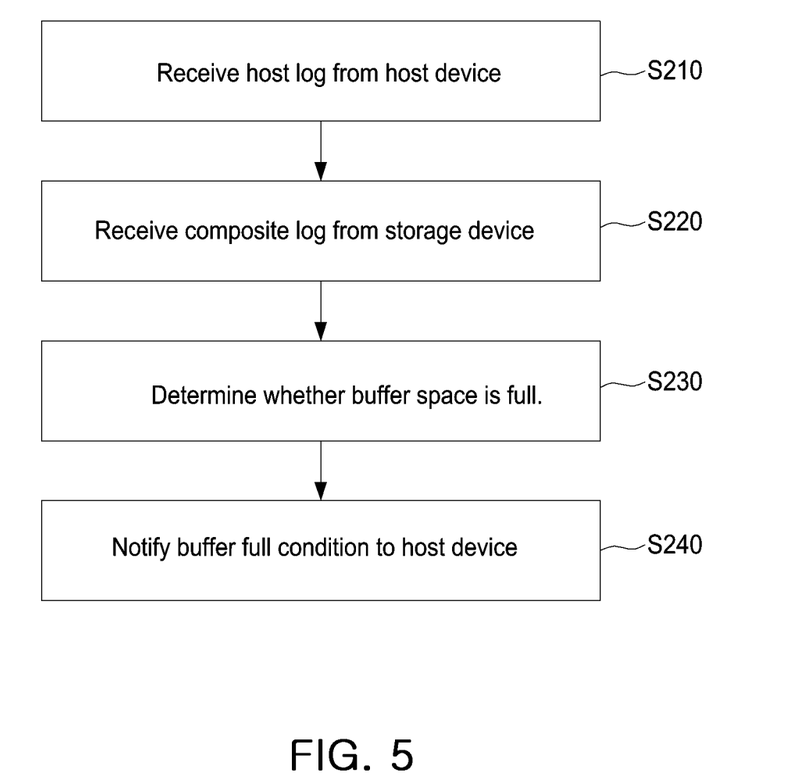
FIG. 5 is a flowchart illustrating an operation of a shared memory according to an example embodiment.

FIG. 5 is a flowchart illustrating an operation of a shared memory 120 according to an example embodiment. Referring to FIGS. 1 to 5, the shared memory 120 may operate, as follows.

The shared memory 120 may receive a new host log from the host device 100 (S210). The received host log may be transmitted based on a write request from the host device 100. According to an example embodiment, the received host log may be transmitted in response to a write request from the host device 100. The shared memory 120 may receive a composite log from the storage device 200 (S220). The composite log may be an integrated log of a host/storage device. The shared memory 120 may determine whether a buffer space, in which the composite log is stored, is full (S230). When the buffer space is full, the shared memory 120 may notify the host device 100 of buffer full conditions (S240).

Figure 6:
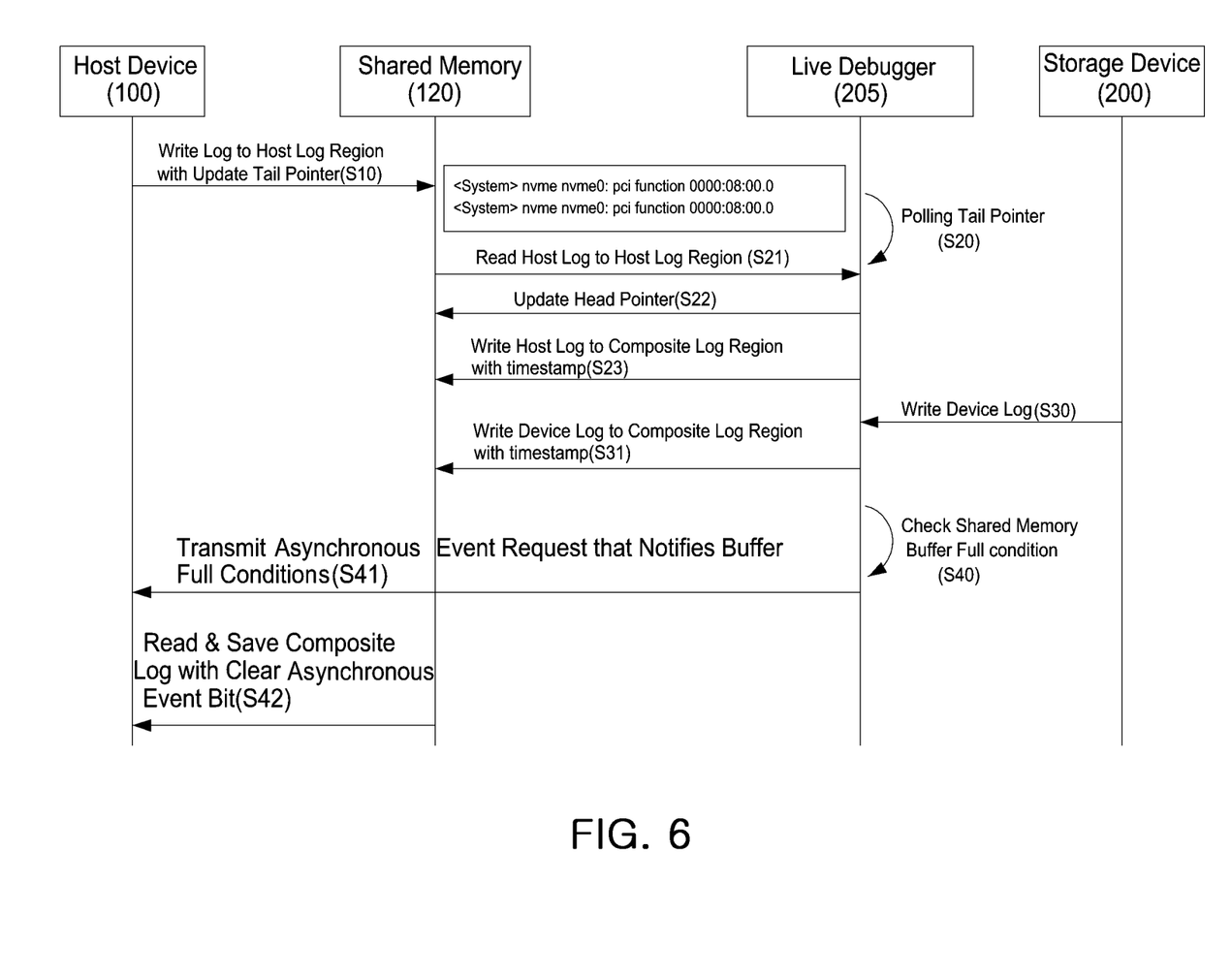
FIG. 6 is a ladder diagram illustrating a log management operation of a host system according to an example embodiment.

FIG. 6 is a ladder diagram illustrating a log management operation of the host system 10 according to an example embodiment. Referring to FIGS. 1 to 6, the log management operation of the host system 10 may be performed, as follows.

The host device 100 and the storage device 200 may set the shared memory 120. The shared memory 120 may be a component of the host device 100 or a component of the storage device 200. In an example embodiment, the shared memory 120 may be set after being divided into a host log region 121 and a composite log region 122.

The host device 100 may write a log of the host device 100 to the host log region 121 of the shared memory 120 and may update a tail pointer of the host log region 121 (S10). According to an example embodiment, the host device 100 may write a log of the host device 100 to the host log region 121 of the shared memory 120 and may simultaneously update a tail pointer of the host log region 121 (S10).

The live debugger 205 is polling the tail pointer of the host log region 121 (S20). When recognizing polling update of the tail pointer, the live debugger 205 may read a log newly written by the host device 100 (S21), and may add information such as a timestamp, a log type, or the like, to the read log to generate a composite log such that the log may be easily checked in a debug operation and may update a head pointer of the shared memory 120 (S22). The live debugger 205 may write the generated composite log to the composite log region 122 of the shared memory 120 (S23).

The live debugger 205 may collect a device log. For example, the device logs may be written to the live debugger 205 (S30). The live debugger 205 may add the information such as the timestamp, the log type, or the like, to the collected device log to generate a composite log and may write the generated composite log to the composite log region 122 of the shared memory 120 (S31).

The live debugger 205 may check whether the composite log region 122 of the shared memory 120 is full (S40). When the composite log region 122 is full, the storage device 200 may notify the host device 100 of information that the composite log region 122 is full, through an asynchronous event request (AER) of an NVMe (S41).

The host device 100 may clear a retain asynchronous event (RAE) bit while reading the composite log in the composite log region 122, so that the live debugger 205 may write a new log (S42). The host device 100 may manage log information, read in the composite log region 122, by storing the log information as a file.

In an example embodiment, when the host device 100 may not read a corresponding region in a state in which the composite log region 122 is full, the live debugger 205 may not store a log to be generated later or may overwrite an existing log.

The host device 100 may read the stored composite log information, and may use the composite log information in debugging. In this case, the host device 100 may be filtered with information such a log type, or the like, to be used.

Figure 7:
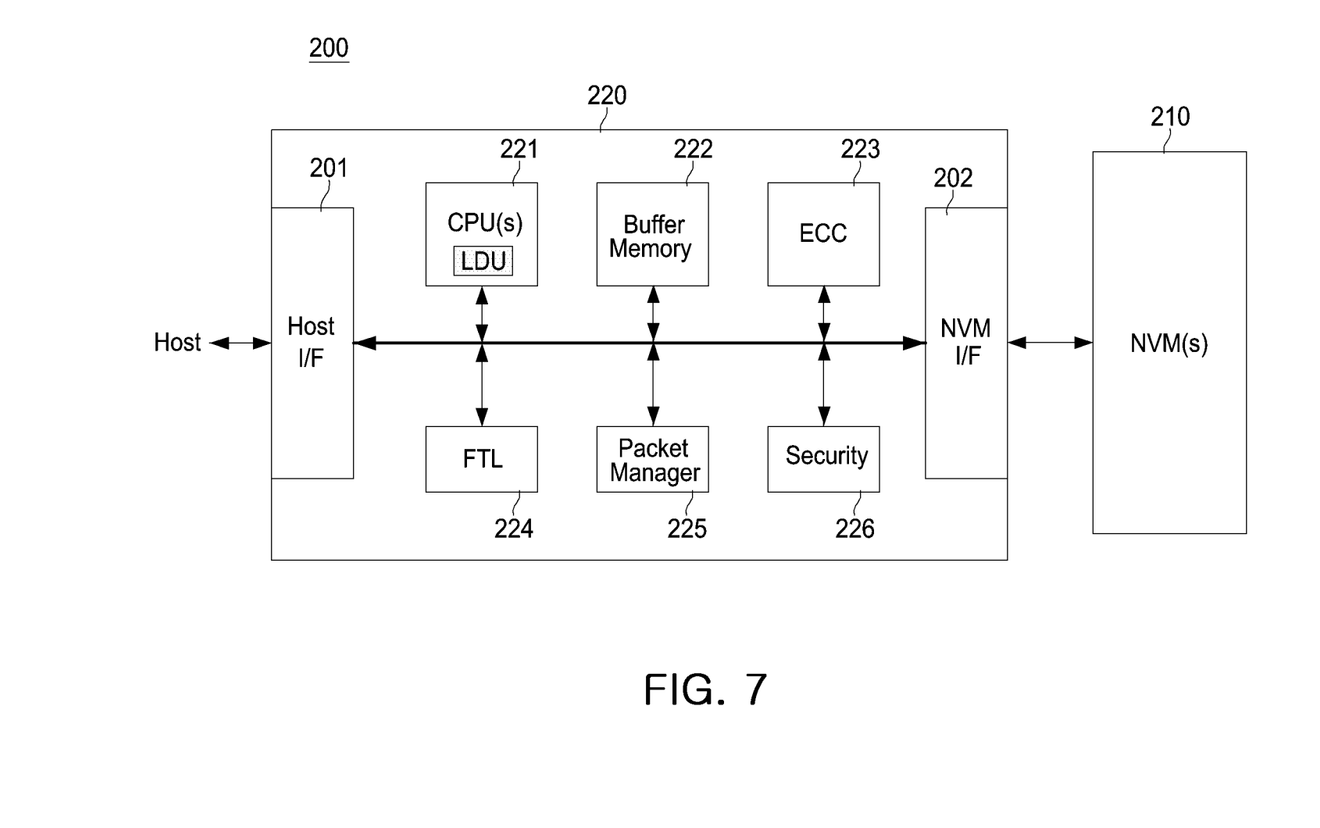
FIG. 7 is a diagram illustrating a storage device according to an example embodiment.

FIG. 7 is a diagram illustrating a storage device 200 according to an example embodiment. Referring to FIG. 7, the storage device 200 may include at least one nonvolatile memory device 210 and a controller 220 controlling the at least one nonvolatile memory device 210.

The controller 220 may include a host interface circuit 201, a volatile memory interface circuit 202, at least one processor 221, a buffer memory 222, an error correction circuit 223, a flash translation layer (FTL) manager 224, and a packet manager 225, and an encryption device (Security device) 226.

The host interface circuit 201 may be configured to transmit and receive packets to and from the host. A packet, transmitted from the host to the host interface circuit 201, may include a command or data to be written to the nonvolatile memory device 210. A packet, transmitted from the host interface circuit 201 to the host, may include a response to a command or data read from the nonvolatile memory device 210. The host interface circuit 201 may be configured to support a host performance buffer (HPB) function.

In an example embodiment, the host interface circuit 201 may be connected to the host device 100 through a universal flash storage (UFS), an embedded multimedia card (eMMC), a serial advanced technology attachment (SATA) bus, a small computer small interface (SCSI) bus, a nonvolatile memory express (NVMe) bus, or a serial attached SCSI (SAS) bus.

The memory interface circuit 202 may transmit data to be written to the nonvolatile memory device 210 to the nonvolatile memory device 210, or may receive data read from the nonvolatile memory device 210. The memory interface circuit 202 may be configured to comply with a standard protocol such as Joint Electron Device Engineering Council (JDEC) or Open NAND Flash Interface (ONFI).

The at least one processor 221 may be configured to control the overall operation of the storage device 200. The at least one processor 221 may be configured to drive the live debugger (LDU) described with reference to FIGS. 1 to 6. The live debugger (LDU) may be configured to collect logs of a host/storage device, generate an integrated log, and store the integrated log in a shared memory.

The buffer memory 222 may be implemented as a volatile memory (for example, a static random access memory (SRAM), a dynamic RAM (DRAM), a synchronous RAM (SDRAM), or the like), or a nonvolatile memory (a flash memory, a phase-change RAM (PRAM), a magneto-resistive RAM (MRAM), a resistive RAM (ReRAM), a ferroelectric RAM (FRAM), or the like).

The ECC circuit 223 may be configured to generate an error correction code during a program operation and to recover data DATA using the error correction code during a read operation. For example, the ECC circuit 223 may generate an error correction code (ECC) to correct a failure bit or an error bit of the data DATA received from the nonvolatile memory device 220. The ECC circuit 230 may perform error correction encoding of data, provided to the nonvolatile memory device 210, to generate data DATA to which a parity bit is added. The parity bit may be stored in the nonvolatile memory device 210.

The ECC circuit 223 may perform error correction decoding on the data DATA output from the nonvolatile memory device 210. The ECC circuit 230 may correct an error using a parity. The ECC circuit 230 may correct an error using coded modulation such as a low density parity check (LDPC) code, a BCH code, a turbo code, a Reed-Solomon code, a convolution code, a recursive systematic code (RSC), trellis-coded modulation (TCM), block coded modulation (BCM), or the like. When an error is uncorrectable by the error correction circuit 230, a read retry operation may be performed.

The flash translation layer manager 224 may perform various functions such as address mapping, wear-leveling, and garbage collection. The address mapping is an operation of changing a logical address, received from a host, into a physical address used to actually store data in the nonvolatile memory 221. The wear-leveling is a technology for preventing excessive deterioration of a specific block by allowing the blocks, included in the nonvolatile memory 221, to be evenly used and may be implemented through, for example, a firmware technology of balancing erase counts of physical blocks. The garbage collection is a technology for securing capacity available in the nonvolatile memory 221 by copying valid data of a block to a new block and then erasing the existing block.

The packet manager 225 may generate a packet according to a protocol of an interface negotiated with the host, or may parse various pieces of information from a packet received from the host. The buffer memory 222 may temporarily store data to be written to the nonvolatile memory 210 or data to be read from the nonvolatile memory 210. In some embodiments, the buffer memory 222 may be a component provided in the storage controller 1210. In other embodiments, the buffer memory 222 may be provided outside the storage controller 1210.

The encryption device 226 may perform at least one of an encryption operation and a decryption operation on data input to the storage controller 210 using a symmetric-key algorithm. The encryption device 226 may perform encryption and decryption of data using an Advanced Encryption Standard (AES) algorithm. The encryption device 226 may include an encryption module and a decryption module. In an example embodiment, the encryption device 226 may be implemented in hardware/software/firmware.

The encryption device 226 may perform a self-encryption disk (SED) function or a trusted computing group (TCG) security function. The SED function may store encrypted data in the nonvolatile memory device 210 using an encryption algorithm, or may decrypt data encrypted from the nonvolatile memory device 210. This encryption/decryption operation may be performed using an internally generated encryption key. The TCG security function may provide a mechanism enabling access to user data of the storage device 200 to be controlled. For example, the TCG security function may perform an authentication procedure between an external device and the storage device 200. In an example embodiment, the SED function or the TCG security function may be optionally selected.

The storage device according to an example embodiment may include a specific-purpose processor for managing debugging information.

Figure 8:
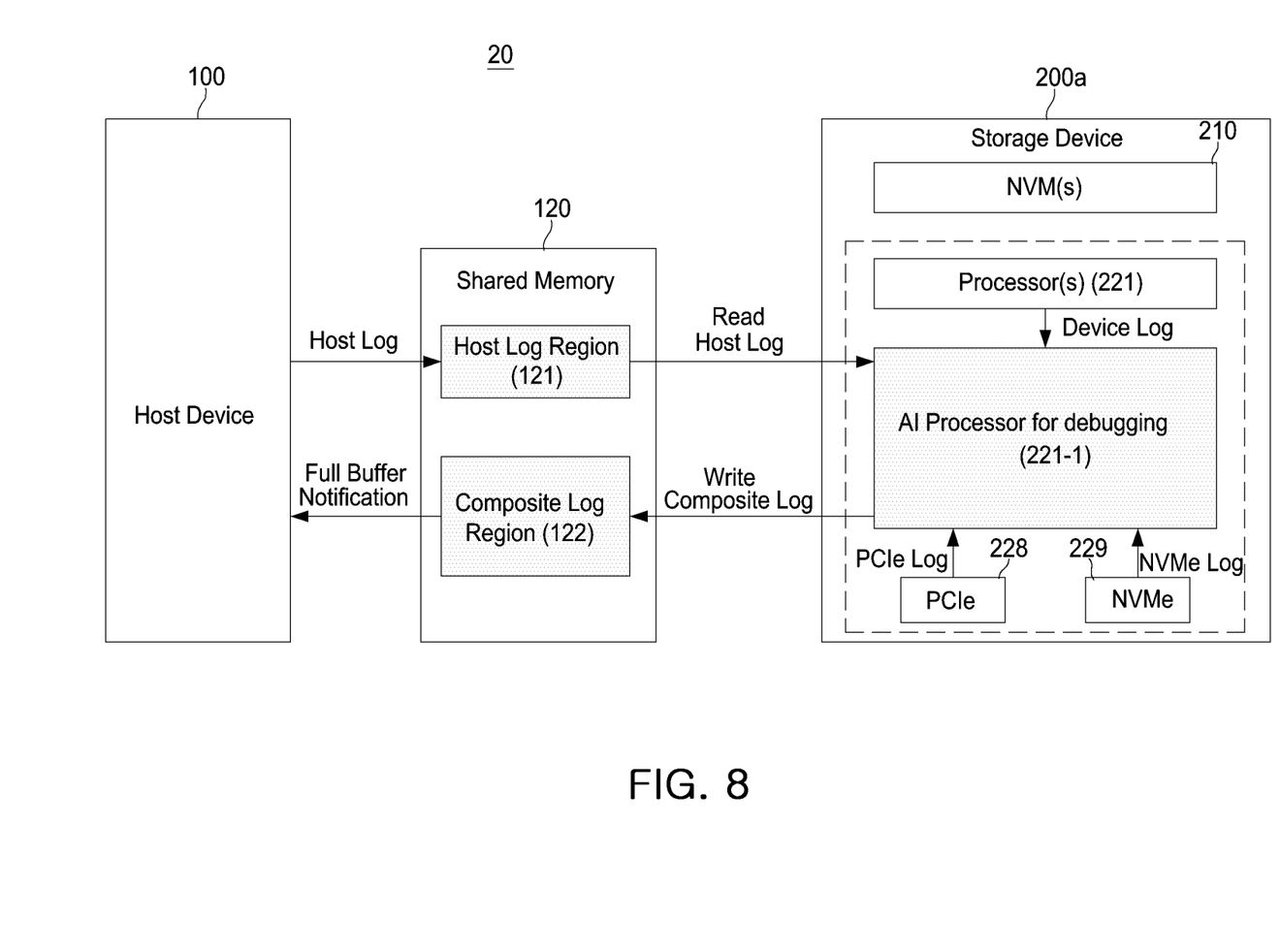
FIG. 8 is a diagram illustrating a host system according to another example embodiment.

FIG. 8 is a diagram illustrating a host system 20 according to another example embodiment.

Referring to FIG. 8, the host system 20 may include a host device 100, a shared memory 120, and a storage device 200a. The host system 20 may include an artificial intelligence processor 206 managing an integrated log, as compared with the host system 10 illustrated in FIG. 2. The artificial intelligence processor 206 may monitor generation of the host log, read a host log from the shared memory 120 when the host log is generated, collect device logs when the log is generated from the internal components of the storage device 200a, and generate an integrated log in the same format from the host log and device logs. In addition, the artificial intelligence processor 206 may monitor buffer-full of the shared memory 120, and may notify a state of a buffer to the host device 100 when recognizing the buffer-full.

The shared memory according to an example embodiment may be an internal component of a host device or an internal component of a storage device.

Figure 9A:
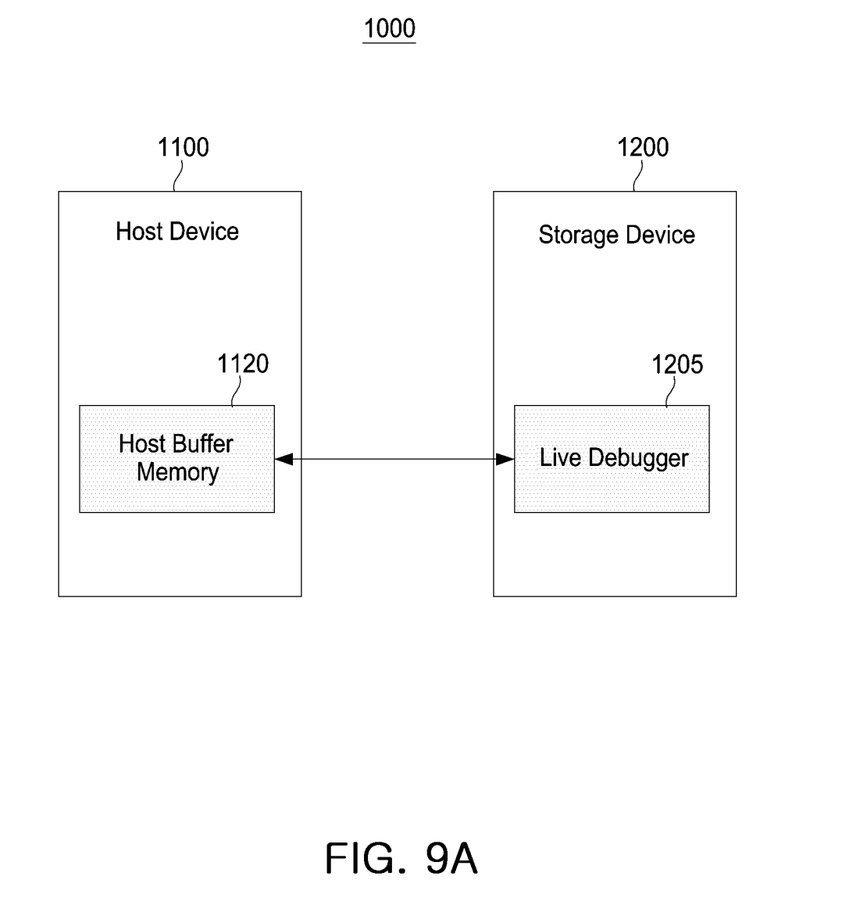
FIG. 9A is a diagram illustrating a host system using a host buffer memory of a host device as a shared memory.
Figure 9B:
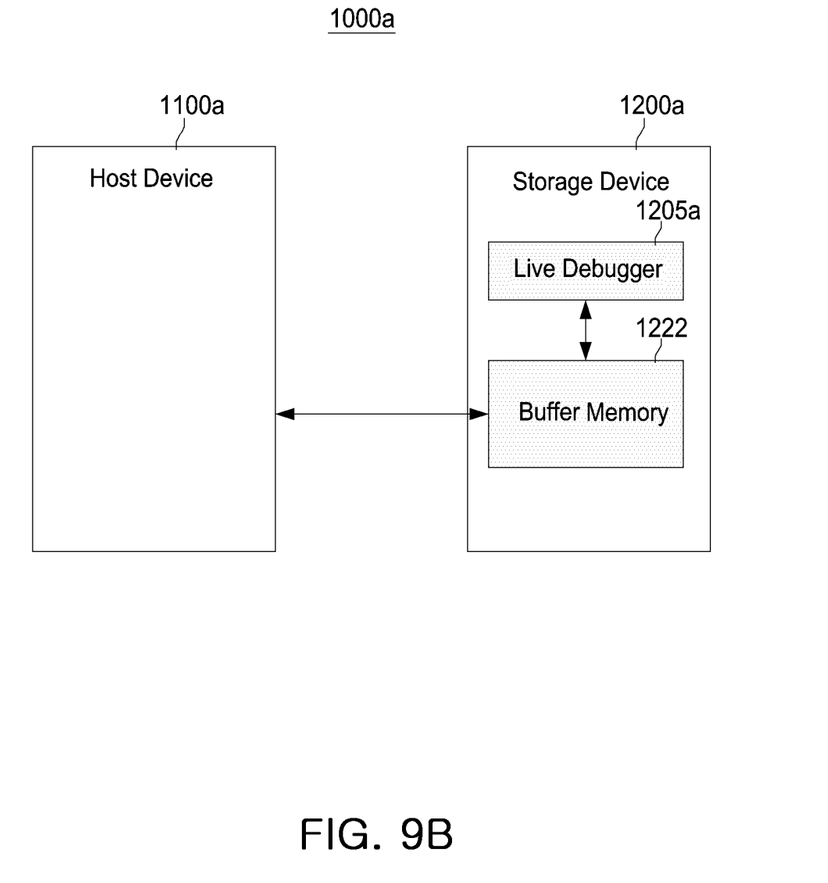
FIG. 9B is a diagram illustrating a host system using a buffer memory of a storage device as a shared memory.

FIG. 9A is a diagram illustrating a host system 1000 using a host buffer memory 1120 of a host device 1100 as a shared memory, and FIG. 9B is a diagram illustrating a host system 1000a using a buffer memory 1222 of a storage device 1200a as a shared memory.

Referring to FIG. 9A, the host system 1000 may include a host device 1100 and a storage device 1200. The host device 1100 may include a host buffer memory 1120 performing a shared memory function shared by the host device 1100 and the storage device 1200. The host buffer memory 1120 may be configured to perform the function of the shared memory 120 illustrated in FIG. 2. The storage device 120 includes a live debugger 1205 collecting logs of the host device 1100 and the storage device 1200 and adding additional information to the collected logs to generate composite logs arranged in a time sequence.

Referring to FIG. 9B, the host system 1000a may perform the above-described shared memory functions for a buffer memory 1222 of a storage device 1200a, as compared with that illustrated in FIG. 9B. A live debugger 1205a may collect logs, generated by a host device 1100a and the storage device 1200a, and may convert the collected logs into an integrated log format and manage the same.

The host system according to an example embodiment may further include an additional device to perform a security function between the host device and the storage device.

Figure 10:
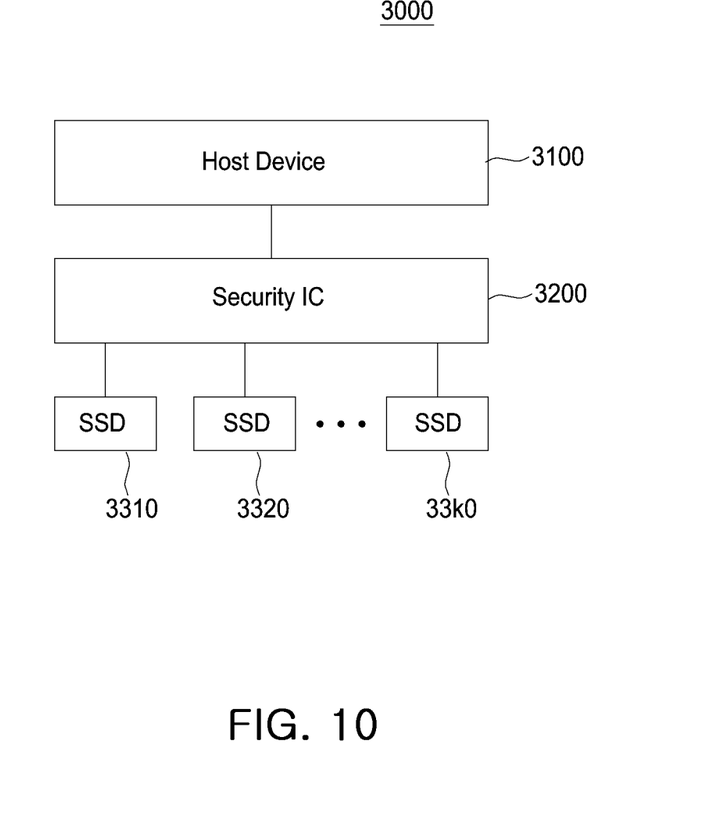
FIG. 10 is a diagram illustrating a host system according to another example embodiment.

FIG. 10 is a diagram illustrating a host system 3000 according to another example embodiment. Referring to FIG. 10, the host system 3000 may include a host device 3100, a security chip 3200, and a plurality of storage devices 3310, 3320 through 33k0 (where k is an integer greater than or equal to 2). The security chip 3200 may be connected between each of the storage devices 3310, 3320 through 33k0 and the host device 3100, and may be configured to take charge of data communication security. The host device 3100 and each of the devices 3310, 3320, through 33k0 may share a memory to manage an integrated log for implementing the debugging mechanism described in FIGS. 1 to 9.

The storage device according to example embodiments may be applied to a data server system.

Figure 11:
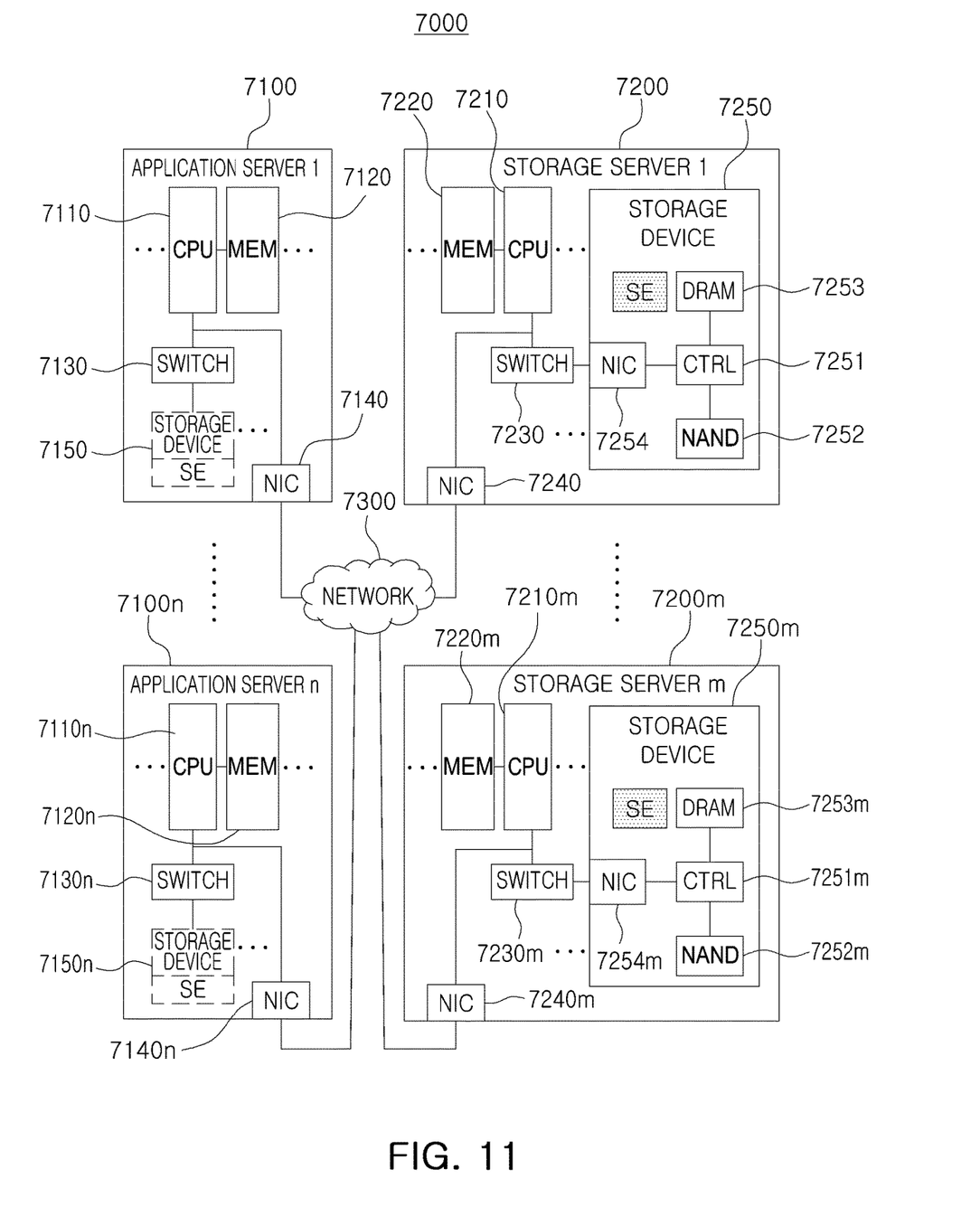
FIG. 11 is a diagram illustrating a data center to which a memory device according to an example embodiment is applied.

FIG. 11 is a diagram illustrating a data center to which a memory device according to an example embodiment is applied. Referring to FIG. 11, a data center 7000 is a facility collecting various types of data and providing services, and may also be referred to as a data storage center. The data center 7000 may be a system for operating a search engine and a database or may be a computing system used by companies such as banks or government agencies. The data center 7000 may include application servers 7100 to 7100n and storage servers 7200 to 7200m. The number of the application servers 7100 to 7100n and the number of the storage servers 7200 to 7200m may be variously selected according to example embodiments, and the number of the application servers 7100 to 7100n and the number of the storage servers 7200 to 7200m may be different from each other.

The application server 7100 or the storage server 7200 may include at least one of processors 7110 and 7210 and memories 7120 and 7220. Referring to the storage server 7200 as an example, the processor 7210 may control an overall operation of the storage server 7200 and may access the memory 7220 to execute instructions and/or data loaded in the memory 7220. The memory 7220 may be a double data rate synchronous DRAM (DDR SDRAM), a high bandwidth memory (HBM), a hybrid memory cube (HMC), a dual in-line memory module (DIMM), an optane DIMM, or a nonvolatile DIMM (NVMDIMM). According to an example embodiment, the number of processors 7210 and the number of memories 7220 included in the storage server 7200 may be variously selected. In an example embodiment, the processor 7210 and memory 7220 may provide a processor-memory pair. In an example embodiment, the number of the processor 7210 and the memory 7220 may be different from each other. The processor 7210 may include a single-core processor or a multicore processor. The above description of the storage server 7200 may be similarly applied to the application server 7100. According to an example embodiment, the application server 7100 may not include a storage device 7150. The storage server 7200 may include at least one storage device 7250. The number of storage devices 7250, included in the storage server 7200, may be variously selected according to example embodiments.

The application servers 7100 to 7100*n* and the storage servers 7200 to 7200*m* may communicate with each other through a network 7300. The network 7300 may be implemented using a fiber channel (FC) or Ethernet. The FC may be a medium used for relatively high-speed data transmission, and may be an optical switch providing high performance/high availability. Depending on an access method of the network 7300, the storage servers 7200 to 7200*m* may be provided as a file storage, a block storage, or an object storage.

In an example embodiment, the network 7300 may be a storage-only network such as a storage area network (SAN). For example, the SAN may be an FC-SAN which uses an FC network and is realized according to an FC protocol (FCP). As another example, the SAN may be an IP-SAN which uses a TCP/IP network and is realized according to an iSCSI (SCSI over TCP/IP or Internet SCSI) protocol. In other example embodiments, the network 7300 may be a general network such as a TCP/IP network. For example, the network 7300 may be implemented according to protocols such as FC over Ethernet (FCOE), network attached storage (NAS), NVMe over Fabrics (NVMe-oF), and the like.

Hereinafter, the application server 7100 and the storage server 7200 will be mainly described. The description of the application server 7100 may also be applied to other application servers 7100*n*, and the description of the storage server 7200 may also be applied to other storage servers 7200*m*.

The application server 7100 may store data, requested to be stored by a user or a client, in one of the storage servers 7200 to 7200*m* through the network 7300. In addition, the application server 7100 may obtain data, requested to be read by the user or the client, from one of the storage servers 7200 to 7200*m* through the network 7300. For example, the application server 7100 may be implemented as a web server, a database management system (DBMS), or the like.

The application server 7100 may access a memory 7120*n* or a storage device 7150*n*, included in another application server 7100*n*, through the network 7300 or may access the memories 7220 to 7220*m* or the storage devices 7250 to 7250*m*, included in the storage servers 7200 to 7200*m*, through the network 7300. Accordingly, the application server 7100 may perform various operations on data stored on the application servers 7100 to 7100*n* and/or the storage servers 7200 to 7200*m*. For example, the application server 7100 may execute a command to move or copy data between the application servers 7100 to 7100*n* and/or the storage servers 7200 to 7200*m*. In this case, the data may be moved directly from the storage devices 7250 to 7250*m* of the storage servers 7200 to 7200*m* to the memories 7120 to 7120*n* of the application servers 7100 to 7100*n* or via the memories 7220 to 7220*m* of the storage servers 7200 to 7200*m*. The data moved through the network 7300 may be encrypted data for security or privacy.

Referring to the storage server 7200 as an example, the interface 7254 may provide a physical connection between the processor 7210 and the controller 7251 and a physical connection between the NIC 7240 and the controller 7251. For example, the interface 7254 may be implemented by a direct attached storage (DAS) method in which the storage device 7250 is directly connected to a dedicated cable. In addition, referring to the storage server 7200 as an example, an interface (NIC) 7254 may provide a physical connection between the processor 7210 and a controller 7251 and a physical connection between an NIC 7240 and the controller 7251. For example, the interface 7254 may be implemented by a direct attached storage (DAS) method that directly accesses the storage device 7250 by a dedicated cable. In addition, for example, the interface 7254 may be implemented by various interface schemes such as advanced technology attachment (ATA), serial ATA (SATA), external SATA (e-SATA), small computer small interface (SCSI), serial attached SCSI (SAS), peripheral component interconnection (PCI), PCI express (PCIe), NVM express (NVMe), IEEE 1394, universal serial bus (USB), secure digital (SD) card, multi-media card (MMC), embedded multi-media card (e-MMC), universal flash storage (UFS), embedded universal flash storage (eUFS), compact flash (CF) card interface.

The storage server 7200 may further include a switch 7230 and a NIC 7240. The switch 7230 may selectively connect the processor 7210 and the storage device 7250 under the control of the processor 7210 or selectively connect the NIC 7240 and the storage device 7250.

In an example embodiment, the NIC 7240 may include a network interface card, a network adapter, and the like. The NIC 7240 may be connected to the network 7300 by a wired interface, a wireless interface, a Bluetooth interface, an optical interface, or the like. The NIC 7240 may include an internal memory, a DSP, a host bus interface, and the like and may be connected to the processor 7210 and/or the switch 7230 through the host bus interface. The host bus interface may be implemented as one of the examples of the interface 7254 described above. In an example embodiment, the NIC 7240 may be integrated with at least one of the processor 7210, the switch 7230, and the storage device 7250.

In the storage servers 7200 to 7200*m* or the application servers 7100 to 7100*n*, the processor may transmit a command to the storage devices 7130 to 7130*n* and 7250 to 7250*m* or the memories 7120 to 7120*n* and 7220 to 7220*m* to write data or read data. In this case, the data may be data error-corrected through an error correction code (ECC) engine. The data may be data which has undergone data bus inversion (DBI) or data masking (DM), and may include cyclic redundancy code (CRC) information. The data may be data encrypted for security or privacy.

The storage devices 7150 to 7150*n* and 7250 to 7250*m* may transmit a control signal and a command/address signal to NAND flash memory devices 7252 to 7252*m* in response to a read command received from the processor. Accordingly, when data is read from the NAND flash memory devices 7252 to 7252*m*, a read enable (RE) signal may be input as a data output control signal to serve to output data to a DQ bus. A data strobe (DQS) may be generated using the RE signal. The command and address signal may be latched in a page buffer according to a rising edge or a falling edge of a write enable (WE) signal.

In an example embodiment, the storage devices 7150 to 7150*m* and 7250 to 7250*m* may perform integrated log management for a debugging operation, as described with reference to FIGS. 1 to 10.

The controller 7251 may control an overall operation of the storage device 7250. In an example embodiment, the controller 7251 may include a static random access memory (SRAM). The controller 7251 may write data into the NAND flash 7252 in response to a write command or may read data from the NAND flash 7252 in response to a read command. For example, the write command and/or read command may be provided from the processor 7210 in the storage server 7200, the processor 7210*m* in another storage server 7200*m*, or the processors 7110 to 7110*n* in the application servers 7100 to 7100*n*. A DRAM 7253 may temporarily store (buffer) the data written into the NAND flash 7252 or data read from the NAND flash 7252. In addition, the DRAM 7253 may store metadata. The metadata is user data or data generated by the controller 7251 to manage the NAND flash 7252.

Example embodiments provide a solution to address difficult issues which may be addressed by comprehensively considering operations of a device and a host system through a mechanism for managing and storing logs of the host system and SSD equipment using a shared memory.

According to a storage device, a host system including the storage device, and a method of operating the storage device described above, a memory for integrating and managing log information may be shared to reduce time required for debugging and to effectively perform debugging.

While example embodiments have been shown and described above, it will be apparent to those skilled in the art that modifications and variations could be made without departing from the scope of the inventive concept as defined by the appended claims.

What is claimed is:

1. A host system comprising:
   a storage device;
   a shared memory separate from the storage device; and
   a host device configured to generate a host log of the host device and store the host log in a first region of the shared memory,
   wherein the storage device is further configured to:
      read the host log from the first region of the shared memory,
      generate composite logs by adding a timestamp and log-type information to the host log and at least one storage device log of the storage device, and
      write the composite logs in a second region of the shared memory.

2. The host system of claim 1, wherein the host device is further configured to write the host log in the first region of the shared memory after generating the host log.

3. The host system of claim 1, wherein the storage device comprises a live debugger configured to recognize that the host log is written to the shared memory, based on a register polling scheme or an interrupt scheme.

4. The host system of claim 3, wherein the live debugger is configured to read the host log from the shared memory after the host log is written to the shared memory.

5. The host system of claim 3, wherein the live debugger is configured to:
   synchronize the host log and the at least one storage device log with each other in a unified format to generate the composite logs, and
   write the generated composite logs to a composite log region of the shared memory.

6. The host system of claim 1, wherein the at least one storage device log comprises an interface log generated by at least one host interface, and a device log generated by a processor.

7. The host system of claim 1, wherein the timestamp is a timestamp of the storage device or a timestamp received from the host device through a set feature command.

8. The host system of claim 1, wherein the storage device is further configured to:
   determine whether a buffer corresponding to a composite log region of the shared memory is full, and
   notify the host device of buffer-full information when the buffer is full.

9. The host system of claim 8, wherein the buffer-full information is transmitted to the host device in an asynchronous event request scheme or a sideband interface scheme.

10. The host system of claim 1, wherein the host device is further configured to process a log, which is generated while storing the host log, in a double buffering scheme.

11. The host system of claim 1, wherein the storage device is further configured to read the host log, which was previously stored in the shared memory by the host device.

12. A host system comprising:
   a host device configured to generate a first log;
   a storage device configured to generate at least one second log; and
   a shared memory configured to store the first log and composite logs corresponding to the first log and the at least one second log,
   wherein the storage device is further configured to:
      read the first log from the shared memory,
      generate the composite logs by adding a timestamp and log-type information to the first log and the at least one second log, and
      write the composite logs to the shared memory,
   wherein the storage device comprises a live debugger configured to recognize that the first log is written to the shared memory, based on a register polling scheme or an interrupt scheme.

13. A host system comprising:
   a host device configured to generate a first log;
   a storage device configured to generate at least one second log; and
   a shared memory configured to store the first log and composite logs corresponding to the first log and the at least one second log,
   wherein the storage device is further configured to:
      read the first log from the shared memory,
      generate the composite logs by adding a timestamp and log-type information to the first log and the at least one second log, and
      write the composite logs to the shared memory,
   wherein the storage device is further configured to:
      determine whether a buffer corresponding to a composite log region of the shared memory is full, and
      notify the host device of buffer-full information when the buffer is full.

* * * * *